Figure 1:
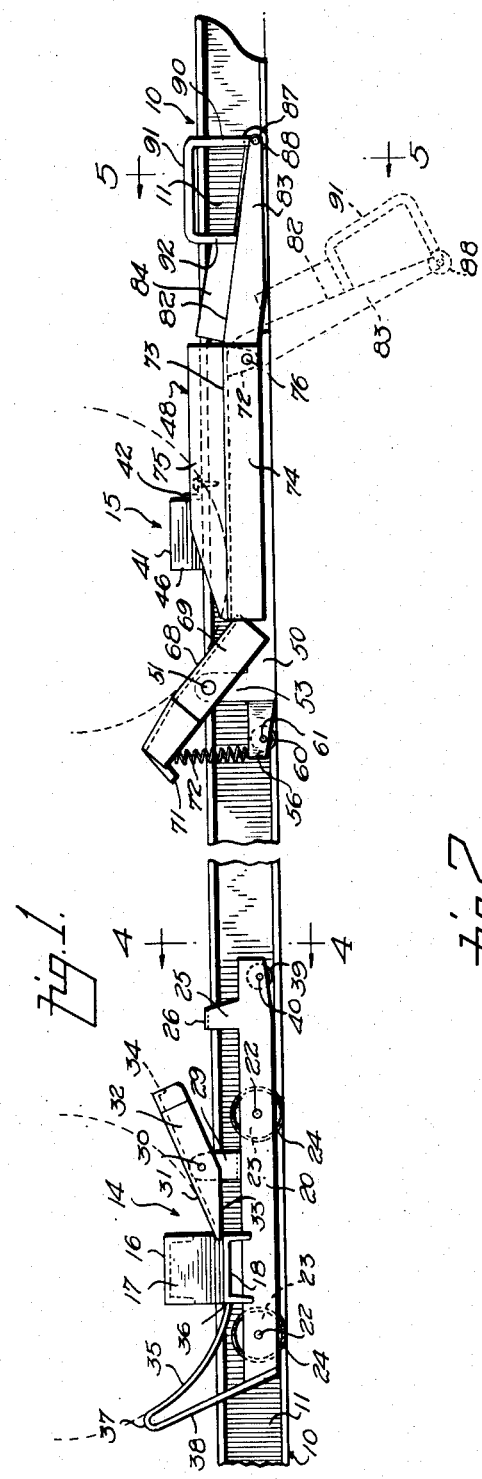

June 9, 1942.  P. J. KROLL  2,285,989
VEHICLE LIFT
Filed April 4, 1941  4 Sheets-Sheet 1

Inventor
P. J. KROLL

June 9, 1942.　　P. J. KROLL　　2,285,989
VEHICLE LIFT
Filed April 4, 1941　　4 Sheets-Sheet 2

Inventor
P. J. KROLL
By
Attorney

June 9, 1942.  P. J. KROLL  2,285,989
VEHICLE LIFT
Filed April 4, 1941  4 Sheets-Sheet 3
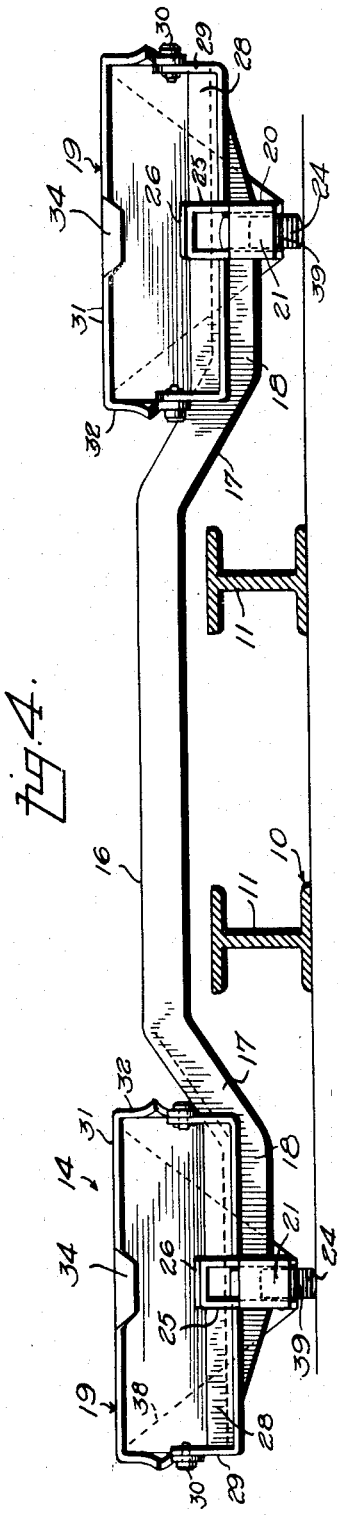
Inventor
P. J. KROLL
C. L. Parker
Attorney

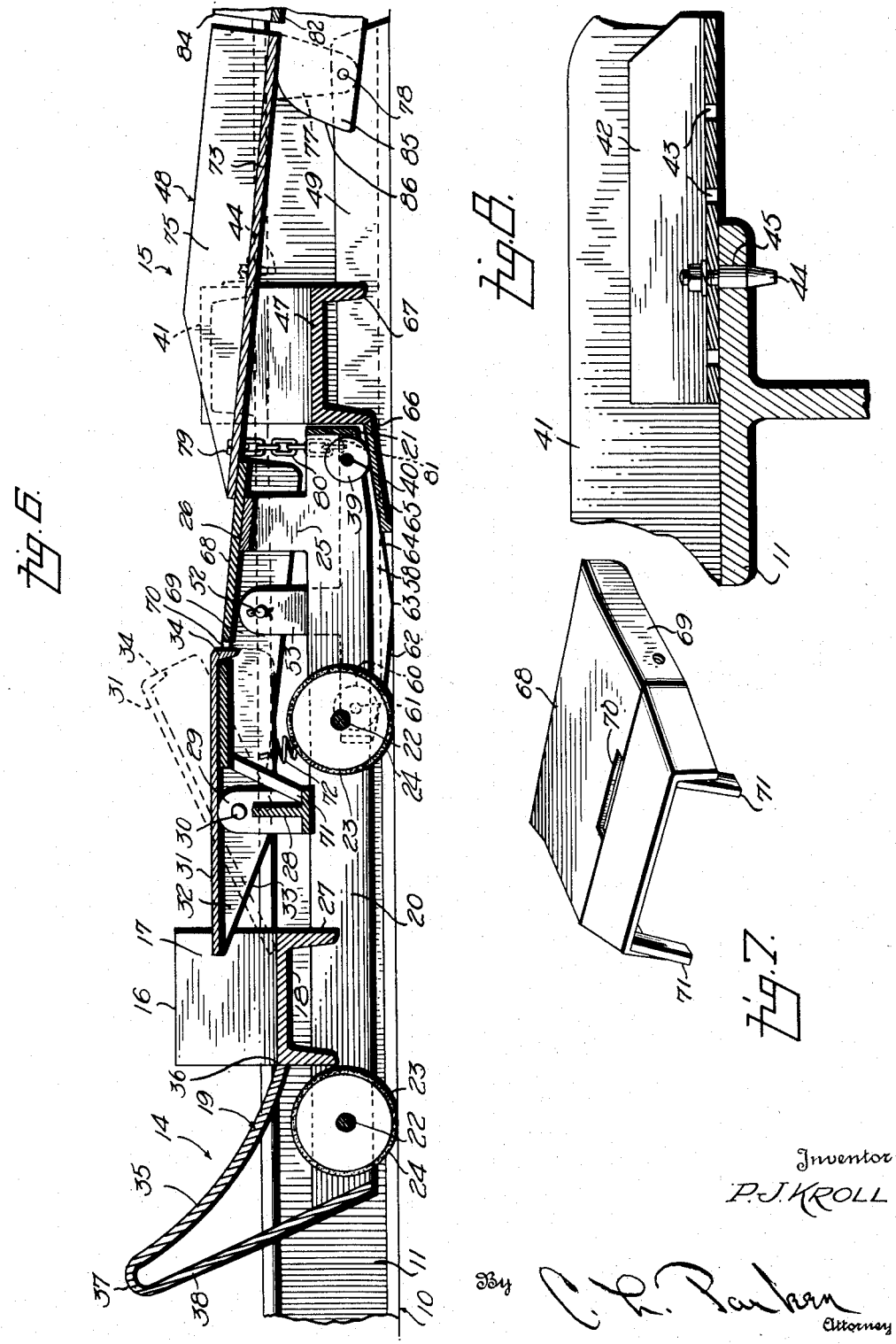

Patented June 9, 1942

2,285,989

UNITED STATES PATENT OFFICE 2,285,989

VEHICLE LIFT

Philip J. Kroll, New Orleans, La., assignor to Marjorie Kroll, Cambridge, Mass.

Application April 4, 1941, Serial No. 386,952

27 Claims. (Cl. 254—89)

This invention relates to vehicle lifts and is an improvement over the structures shown in my prior Patents Nos. 2,199,524, granted May 7, 1940 and 2,231,362, granted February 11, 1941.

There are two well known types of vehicle lifts in common use in motor vehicle service stations, namely, the "run-on" type and the "free-wheel" type. In the first mentioned type runways are provided for the vehicle wheels so that the vehicle may be driven onto the lift, whereupon the lift may be elevated and the vehicle will be supported by the wheels thereof. The "free-wheel" type of lift provides parallel rails engageable beneath the axles of the vehicle to support the vehicle when the lift is elevated.

Each type of lift is advantageous for performing different types of work on a vehicle, but it involves too great an expense and the taking up of too much space in a service station to purchase and install a vehicle lift of each type. Moreover, many service stations equipped with "free-wheel" lifts find such lifts decreasing in usefulness because of the increasing number of motor vehicles provided with individual wheel suspension which renders it impracticable for them to be elevated on a "free-wheel" lift.

In my prior patents referred to I have disclosed two different types of apparatus adapted for use with "free-wheel" lifts to adapt such lifts for use as "run-on" lifts, the apparatus being supported on the rails of the lift and providing means for supporting the vehicle through the wheels thereof. Such prior structures, therefore, provide effective means for converting a "free-wheel" lift into a "run on" lift, thus adapting a single lift in a service station to any use to which a lift may be put and eliminating the necessity for the purchase and installation of two different lifts. The prior structures include two wheel supporting devices, one for the front wheels of the vehicle and the other for the rear vehicle wheels. Both of the wheel supporting devices are readily detachable, and in use, the rear wheel supporting device is fixed against longitudinal movement with respect to the rails and the two devices are normally locked to each other so that when a vehicle is being driven into position, the front vehicle wheels may roll over the rear wheel supporting device and then into position on the front wheel supporting device, whereupon the two devices are disconnected from each other and the further movement of the vehicle forwardly onto the apparatus causes the front wheel supporting device to move with the front vehicle wheels until the rear wheels reach their proper position on the rear wheel supporting device. Both of the wheel supporting devices are provided with means for chocking the vehicle wheels to prevent rolling movement of the vehicle. When it is desired to remove the vehicle, the lift is lowered and the vehicle is backed off from the apparatus, the rear wheels moving from the rear wheel supporting device while the front wheel supporting device moves rearwardly and returns to its interlocking relationship with respect to the rear wheel supporting device, whereupon the front wheels of the vehicle roll from the front wheel supporting device over the rear wheel supporting device and thence completely from the latter device.

The apparatus forming the subject matter of the present invention has for its principal object, generally speaking, the provision of an apparatus for converting a "free wheel" lift into a "run on" lift wherein all of the advantages of the prior structure referred to are retained, but wherein other advantages are introduced, particularly with relation to the simplification of the mechanism, the reduction of the number of parts involved, and the reducing of the cost of manufacture of the apparatus.

A further object is to provide an apparatus of the character referred to wherein the chocking means for the rear vehicle wheels and the interlocking means for connecting the two supporting wheel structures to each other have been materially improved and simplified.

A further object is to provide a simplified rear wheel chocking means wherein the elements which turn to an angular position forwardly of the rear wheels of the vehicle are arranged so that their front ends turn upwardly as distinguished from the prior constructions referred to, and wherein such turning motion is utilized in a simple and effective manner for securing and releasing the two wheel supporting structures with relation to each other.

A further object is to provide an apparatus of the character referred to wherein the rear wheel supporting structure possesses the advantages of the long ramp means of my prior Patent No. 2,231,362, but which is advantageous thereover for the reason that when the lift is elevated with a vehicle thereon, a substantial portion of the rear end of each ramp drops downwardly to an inoperative position, thus avoiding any interference with the entrance of a mechanic between the rear ends of the lift rails to perform work on the vehicle.

A further object is to provide a vehicle lift converting mechanism of the type referred to wherein the adjacent chocking elements of the front and rear wheel supporting devices directly engage each other to lock said devices against movement away from each other while the vehicle is being driven onto or off from the lift.

A further object is to provide a front wheel supporting device having rubber tired rather than metal supporting wheels to avoid abrasion and injury to the concrete supporting surfaces on which such device rolls while a vehicle is being moved onto or off from the apparatus, and to provide in connection therewith effective means for supporting the rear end of the front wheel supporting device with respect to the surrounding surface to prevent any interference with any parts of the apparatus incident to downward movement of the front wheel supporting device by the deforming of the rubber tires under the weight of a vehicle on the lift.

Other objects and advantages of the invention will become apparent during the course of the following description.

Figure 2:
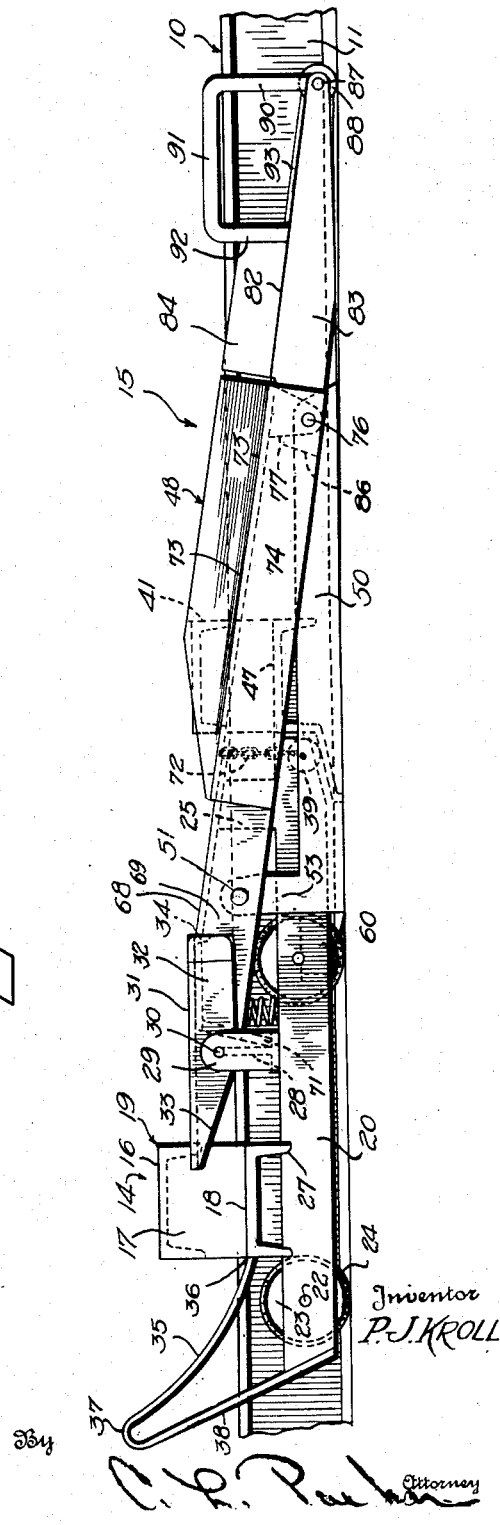
Figure 3:
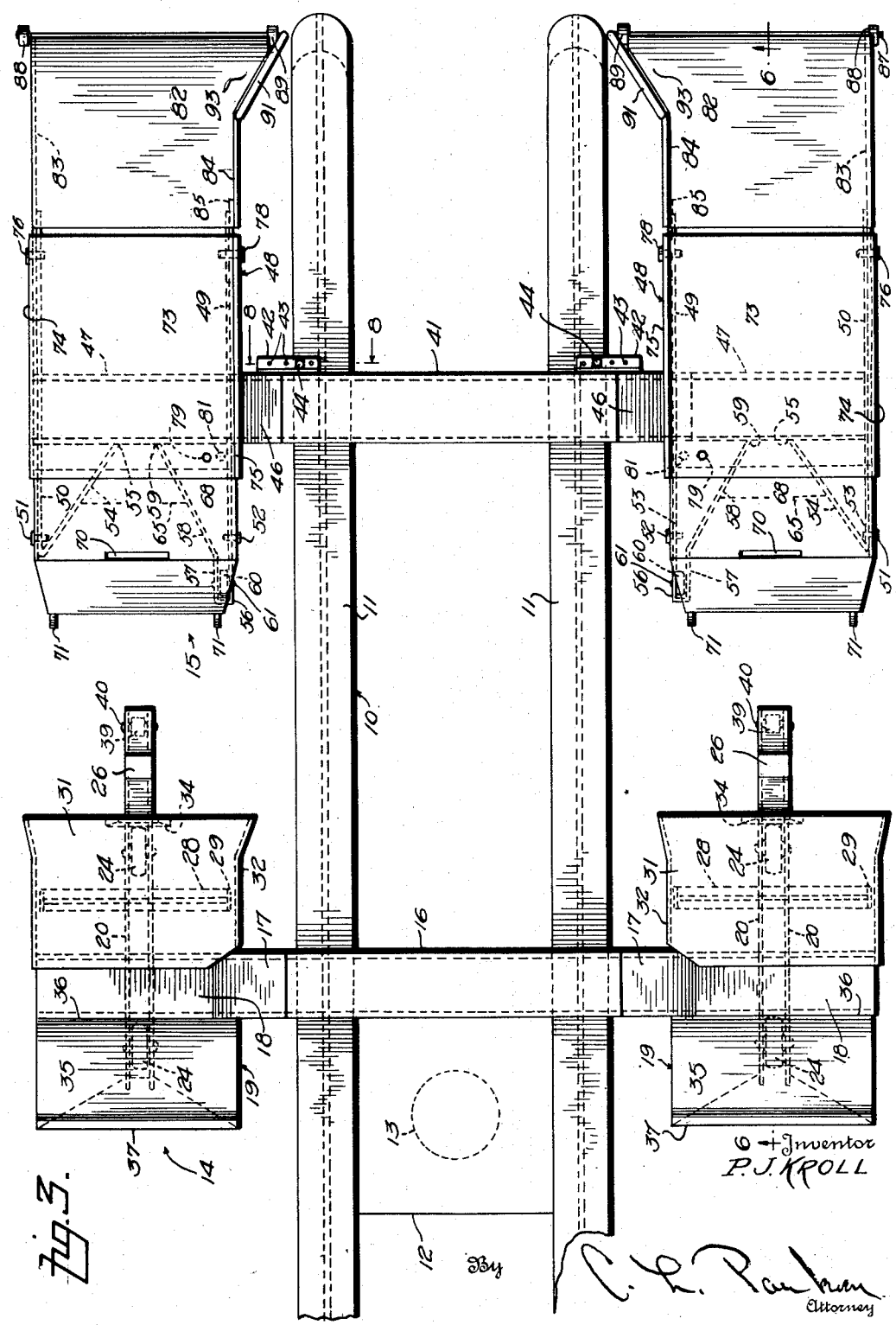

In the drawings I have shown one embodiment of the invention. In this showing:

Figure 1 is a side elevation of the apparatus with the parts in operative position to support a vehicle through the wheels thereof, parts being broken away, Figure 2 is an enlarged side elevation showing the parts in normal positions with the front and rear supporting devices or units in interlocked relationship, Figure 3 is a plan view of the apparatus, Figure 4 is an enlarged transverse sectional view on line 4—4 of Figure 1, Figure 5 is a similar view on line 5—5 of Figure 1, Figure 6 is an enlarged vertical longitudinal sectional view on line 6—6 of Figure 3 showing the two wheel supporting units in interlocking relationship as in Figure 2, Figure 7 is a detail perspective view of one of the front wheel chock elements, and, Figure 8 is a detail sectional view on line 8—8 of Figure 3.

Referring to Figures 1 to 6 inclusive, the numeral 10 designates a conventional "freewheel" automobile lift comprising parallel rails 11 shown as being rigidly connected by a plate 12 carried on the upper end of the lift plunger 13. These elements have not been illustrated in particular detail since they are conventional and form no part per se of the present invention. The apparatus forming the subject matter of the present invention, to be described below, is eliminated from the lift structure when the latter is to be used as a "free-wheel" lift, in which case the vehicle is driven into position over the rails 11, whereupon the lift is elevated and the rails 11 engage the axles of the vehicle to elevate it.

The present invention provides means for converting the "free-wheel" lift into a "run on" lift and comprises front and rear wheel supporting structures respectively indicated as a whole by the numerals 14 and 15. The front wheel supporting structure is in the form of a wheeled dolly and comprises a transverse supporting beam 16, which may be of channeled structure as shown in Figure 6. The central portion of the beam 16 extends transversely of the rails 11 and is normally spaced thereabove as clearly shown in Figure 4. Outwardly of the rails 11, the supporting beam 16 extends downwardly at an angle as at 17 (Figure 4) and thence outwardly horizontally as at 18 to carry the supporting structure for each of the front wheels. Since these two structures are identical, only one need be described in detail.

Each front wheel supporting device has been illustrated as a whole by the numeral 19 and each comprises a pair of parallel supporting side rails 20 which may be formed of a single strip of material bent in substantially U-shape and connected at their rear ends as at 21 (Figure 6). The supporting side rails 20 carry spaced axles 22 on each of which is arranged a supporting wheel 23 preferably provided with a rubber tire 24 the purpose of which will be referred to later. Adjacent its rear end, each rail 20 is provided with an upstanding member 25 and these members are connected at their upper ends by an integral cross member 26 inclined from the horizontal as in Figure 6 for a purpose to be described. The upstanding members 25 may be welded to or formed integral with the respective side rails 20. These side rails are suitably secured to the supporting beam 16. For example, referring to Figure 6, the side rails 20 may be notched as at 27 to receive the adjacent flanges of the end horizontal portion 18 of the beam 16, and such flanges may be welded to the side rails 20 to rigidly connect the latter to the supporting beam 16.

An inverted substantially T-shaped cross member 28 is welded or otherwise secured to the side rails 20 (Figures 3 and 6) and projects a substantial distance on opposite sides of the side rails 20. This cross member is provided at its ends with upstanding bearing ears 29 carrying pivot pins 30. A combined ramp and runway element 31 is arranged over the cross member 28 and is provided with downturned parallel side flanges 32 through which the pivot pins 30 extend to pivotally support the member 31. At their left hand or forward ends, the flanges 32 are tapered as at 33 to decrease in width to permit the member to swing downwardly to the dotted line position shown in Figure 6, as will be obvious. Centrally of its width, the rear end of the member 31 is provided with a downturned lip 34 for a purpose to be described.

As will become obvious the front wheel of a motor vehicle is adapted to roll over the ramp member 31 of each front wheel device 19, whereupon it comes to rest against a curved stationary chock member 35. The chock member 35 has its rear end welded at the point 36 to the adjacent horizontal beam portion 18. At its upper forward end, the chock member 35 is turned as at 37 and then extends downwardly and rearwardly as at 38 in a substantially triangular face tapering to decrease in width at its lower end and with such lower end abutting and preferably welded to the adjacent ends of the side rails 20.

The rear or right hand end of such front wheel supporting unit 19, as viewed in Figure 6, is provided with a relatively small wheel 39 mounted on an axle 40 extending through the side rails 20. This wheel is preferably steel and arranged somewhat above the plane of the bottoms of the wheels 23, and is provided for a purpose to be described.

The rear wheel supporting structure comprises a transverse supporting beam 41, which also may be of inverted channel cross section similar to the beam 16. However, the beam 41 occupies the normal position shown in Figure 5, resting upon and supported by the tops of the lift rails 11. It will become apparent that the beam 16 is normally spaced above the rails 11 to permit the structure 14 to be movable with the front wheels of the vehicle, while the beam 41 seats upon the rails 11 for the reason that the structure 15 is normally fixed against movement longitudinally of the rails 11. To prevent such movement of the structure 15, the beam 41 is provided with angle brackets 42 which may be welded to the beam 41, and these brackets are provided with openings 43 to selectively receive pins 44 (Figures 3 and 8) receivable in openings 45 formed in the upper flanges of the rails 11.

Outwardly of the rails 11 the beam 41 slopes downwardly as at 46 and terminates in horizontal end portions 47 each of which carries a rear wheel supporting structure indicated as a whole by the numeral 48. The structures 48 are identical and accordingly only one need be described in detail. Each of these structures comprises inner and outer parallel side frame members 49 and 50 shown in plan in dotted lines in Figure 3. The rail 50 is provided adjacent its forward end, that is, the left hand end as viewed in Figure 3, with a pivot pin 51 and in axial alignment with such pin, the side rail 49 carries a similar pivot pin 52. These pins are carried by upstanding ears 53 formed integral with the two side rails and illustrated in Figures 1, 2 and 6.

Adjacent the ear 53 of the rail 50, the latter rail is turned inwardly to form an angularly extending portion 54, the extremity of which is welded at the point 55 (to the adjacent horizontal portion 77 of the beam 41). The rail 49 extends to the left, as viewed in Figure 3, beyond its ear 53 to form an extended portion 56. The material of the rail is then extended transversely and to the right to form a portion 57 parallel to the portion 56, and thence the rail extends at an angle as at 58 in the same manner as the portion 54 of the rail 50, and is welded at the point 59 to the beam portion 47. Between the parallel rail portions 56 and 57 is arranged a wheel 60 rotatably supported by such parallel rail portion upon an axle 61. This wheel, of course, is carried by each of the rear wheel supporting units and the two wheels are adapted to form rollers to support the unit 15 as a whole when the latter is moved into its normal position in a manner to be described.

The portion of the rail 49 to the left of the pivot pin 52 is arranged at an incline as at 62 (Figure 6) to permit the opposite end of the unit 15 to be tilted to rest on the wheels 60. From the point at which the rail portion 58 reaches the ground level, that is, from the point 63 (Figure 6) it slopes upwardly as at 64 to the point 59 at which it is welded to the beam portion 47. This is likewise true in the lower edge of the portion 54 of the rail 50, and to the bottoms of these inclined portions of the rail portions 54 and 58 there is welded a plate 65 (Figure 6) the right hand end of which is welded at the point 66 to the beam portion 47. Accordingly it will be apparent that the two rails 49 and 50 and the plate 65 are rigidly fixed to each other and to the beam portion 47. Referring to Figure 6 it also will be noted that the rails 49 and 50 are slotted as at 67 to receive the flanges of the beam portion 47 and are preferably welded thereto to assist in forming a rigid structure.

The ears 53 carry the pivot pins 51 and 52, as previously stated, and these pins pivotally support a ramp plate 68 by extending through downturned flanges 69 formed on the edges thereof. The two structures 14 and 15 normally occupy the interlocked relationship shown in Figure 6 under which conditions the portion of the ramp plate 68 to the right of the pivots 51 and 52 rests upon the cross member 26 of the movable unit 14. As viewed in Figure 6, the ramp plate 68 has its top sloping upwardly from the right hand end thereof to a point spaced from the left hand end of the ramp plate, at which point the ramp plate is provided with an opening 70 which normally receives the downturned lip 34. In the interlocked position of the parts, the ramp plate 31 is approximately horizontal, and the same is true of that portion of the ramp plate 68 which lies beneath the ramp plate 31.

The ramp plate 68 is shown in perspective in Figure 7 of the drawings, and it will be noted that the side flanges of this plate to the left of the opening 70 converge toward each other. Similarly, the flanges 33 of the ramp plate 31 diverge toward their right hand ends as viewed in Figures 3 and 6, and this arrangement is provided to insure the entrance of the left hand end of the ramp plate 68 within the ramp plate 31 when the latter moves toward its interlocking position in a manner to be described. As shown in Figures 6 and 7, the left hand end of the ramp plate 68 is provided with a pair of feet 71, welded to the adjacent ends of the flanges 69 and sloping downwardly and to the left. The lower ends of these feet, as shown in Figure 6 are engageable against the top of one side of the base flange of the cross member 28 to limit turning movement of the ramp plate 68 in a counter-clockwise direction under the weight of a vehicle passing thereover. A tension spring 72 is connected between one of the flanges 69 (Figure 6) and a portion of the side rail structure 49, preferably the portion 57, to tend to resist turning movement of the ramp plate 68 when the two units 14 and 16 are disconnected from each other.

Each rear wheel supporting unit 48 further comprises a ramp section 73 the left hand end of which, in the normal position of the parts, overlaps the right hand end of the ramp plate 68 as shown in Figure 6. Referring to Figure 5 it will be noted that the outer edge of the ramp section 73 is turned downwardly to form a depending flange 74 while the opposite side is turned upwardly to form an upstanding flange 75. The latter flange is turned upwardly for two reasons, namely, to avoid the beam 41 and to provide a guide for the wheels of a vehicle passing thereover. The depending flange 74 is provided adjacent its right hand end as viewed in Figure 1 with a pivot pin 76 which passes through the adjacent end of the side rail 50. The opposite side of the ramp section 73 is provided with a depending ear 77 through which extends a similar pivot pin 78, and this pin also extends through the side rail 49. The pivot pins 76 and 78 are arranged in axial alignment and accordingly pivotally support the ramp section 75. To one side of one of the sloping side rail portions 54 or 58 (Figure 3) an eye 79 is carried by the ramp section 73 and a chain 80 (Figure 6) is connected between this eye and a similar eye 81 carried by the adjacent side rail, such as the side rail 49 as indicated in Figure 3. This chain limits upward movement of the free end of the ramp section 73 and thus prevents upward movement of the adjacent end of the ramp plate 68 sufficiently to become disengaged from adjacent the ramp section 73.

An entrance ramp 82 is pivoted to the pivot pins 76 and 78. As is true of the ramp section 73, the entrance ramp has one edge turned to form a dependent flange 83 while the opposite or inner edge is turned to form an upstanding flange 84 substantially aligned with the flange 75 in the normal position of the parts to assist in guiding the front wheels of an entering vehicle. The depending flange 83 (as shown in Figure 5) receives the pivot pin 76, while the pivot pin 78 is received in a projecting ear member 85 welded or otherwise secured to the ramp section 82. The inner ends of the pivot ear 85 and of the flange 83 are formed with similarly sloped inner ends 86 so that when the entrance ramp drops downwardly to the position shown in dotted lines in Figure 1 turning movement of the entrance ramp will be limited by engagement of the edges 86 beneath the ramp section 73.

The entrance ramp 82 slopes downwardly in alignment with the ramp section 73 when the parts are in the normal position shown in Figure 2. The lower or rear end of the entrance ramp carries a horizontally extending bar 87 forming an axle to receive wheels 88 and 89. From the wheel 89 the bar 87 extends vertically as at 90, then rearwardly at an angle as at 91, to form a handle, thence downwardly as at 92 to be secured in any suitable manner to the entrance ramp 82. The upstanding flange 84 extends only from the vertical portion 92 of the handle 91 to the pivoted end of the entrance ramp, and the remaining portion of the entrance ramp which otherwise would form a portion of the flange 84 is extended horizontally as at 93 (Figure 5) to form a wider entering end on the entrance ramp.

The operation of the apparatus is as follows:

As previously stated, the lift including the rails 11, without the units 14 and 15 thereon, constitutes a conventional "free wheel" lift which is engageable beneath the axles of a motor vehicle to elevate it, leaving the wheels of the vehicle free. The present apparatus is adapted to quickly and easily convert the lift into a "run-on" lift.

When it is desired to convert the lift into a "run on" lift, the operator will grasp the handles 91 and lift the adjacent end of the unit 15, whereupon the opposite end of the unit 15 will be supported on the wheels 60. The operator then may wheel the unit 15 after the manner of a wheelbarrow, and will approach the right hand end of the lift as viewed in Figure 3 and move the unit 15 longitudinally of the rails 11. The unit 15 will be maneuvered until the pins 44 (Figures 3, 5 and 8) are over the openings 45, whereupon the operator will lower the raised end of the unit 15 until the rollers 88 and 89 rest upon the ground, the pins 44 entering the openings 45 during such operation. It will be apparent that the unit 15 will now be fixed against all movements with respect to the rails 11 except upward vertical movement, the weight of the unit, of course, preventing any upward movement thereof.

The unit 14 will now be moved into position from the opposite end of the lift. The elements of the unit 15, when placed in the position referred to, will approximately occupy the normal positions shown in Figure 6, the spring 72 tending to hold the right hand end of the ramp plate 68 in a position approximately in alignment with the ramp section 73, by substantially supporting the weight of the free end thereof. As the unit 14 is moved toward the position shown in Figure 6, therefore, the parts of the unit 15 which cooperate with and engage parts of the unit 14 will be approximately in the necessary positions for the interlocking of the two units. The right hand end of the ramp plate 31 (Figure 6) will be manually held approximately in the dotted line position shown in Figure 6 to pass over the top of the adjacent end of the ramp plate 68 as the unit 14 is moved toward operative position. The left hand end of the ramp plate 68 will be held by the spring 72 in such a position as to clear the adjacent base of the cross member 28 so as to move to the relative position shown in Figure 6.

When the feet 71 are positioned as shown in Figure 6 the ramp plate 31 will be released and since its greater weight is to the right of its pivot axis, the flange 34 will move downwardly into the opening 70. When this position of the parts is reached, it will be obvious that the cross member 26 (Figure 6) will be in contact with the lower face of the ramp plate 68 to prevent downward movement of the right hand end of this plate. Similarly, the roller 39 will occupy its normal position engaging the inclined plate 65 and the lower end of this plate normally is in firm contact with the surrounding surface, which is preferably a concrete floor.

It will be apparent that the foregoing operations may be completed in a very brief time, after which the apparatus is operative as a "run-on" lift. In so using the apparatus, the vehicle will be driven onto the apparatus from the right hand end thereof as viewed in Figures 1, 2, 3 and 6, and it will be obvious that the front wheels of the vehicle readily may roll from the surrounding surface onto the lower ends of the entrance ramps 82. From these ramps the vehicle front wheels will roll over the ramp sections 73 and since the free ends of these ramp sections are supported by the adjacent ends of the ramp plates 68 which, in turn, are supported by the cross members 26, wheels 39 and inclined plates 65, the ramp sections 73 and ramp plate 68 will remain rigidly in the positions shown in Figure 6 so that the front wheels may roll thereover, and thence onto the pivoted ramp plates 31.

The front wheels of the vehicle will then roll across the pivoted ramp plates 31 and as soon as the wheels pass beyond the axes of the pivots 30, the plates 31 will start to swing toward the dotted line position shown in Figure 6 and such position will be reached when the front wheels of the vehicle engage the stationary chocks 35. The front wheels of the vehicle will then be prevented from moving with respect to the unit 14 by the chocks 35 and by the pivoted plates 31, which now act as front wheel chocks.

Movement of the plates 31 to chocking position obviously releases the flanges 34 from the openings 70, and this operation releases the unit 14 from the unit 15, whereupon further forward movement of the vehicle causes the front vehicle wheels to transmit movement to the unit 14 to move it away from the unit 15. Under such conditions the rollers 39 (Figure 6) move away from the inclined plates 65 and the cross members 26 move away from and cease to support the portions of the plates 68 which they formerly engaged. However, the springs 72 hold the respective plates 68 approximately in the same positions.

As the unit 14 moves away from the unit 15, the rear wheels of the vehicle obviously approach the unit 15 and roll over the entrance ramp 82, and thence over the ramp sections 73 whereupon these elements swing downwardly to the position shown in Figure 1 and in so doing depress the adjacent edges of the ramp plates 68 to swing the latter into the inclined position shown in Figure 1. The ramp plates 68 under such conditions become chocks for the rear vehicle wheels.

The lift now may be elevated to lift the vehicle through the wheels thereof. Referring to Figure 4, it will be noted that the supporting beam 16 for the front wheel unit normally is spaced above the tops of the rails 11 and this is for the purpose of permitting free rolling movement of the unit 14 as the vehicle is driven into position, the space permitted being sufficient for such free movement even if the lift rails 11 have not been previously lowered into positive engagement with the surrounding surface. The space permitted between the beam 16 and rails 11 also compensates for any unevenness in the surrounding surface, this further insuring freedom of rolling movement of the unit 14. However, when the lift is elevated movement is immediately transmitted to the unit 15 to lift it, and when the space between the beam 16 and rails 11 has been taken up, vertical movement obviously will be transmitted to the unit 14. The engagement of the beam 16 with the rails 11 obviously frictionally prevents any possibility of the movement of the unit 14 along the rails 11.

As the lift moves upwardly the entrance ramps 82, which turn freely about the pivot pins 76 and 78 (Figures 1 and 5) swing downwardly until they assume the position shown in dotted lines in Figure 1, further movement being prevented by engagement of the edges 86 (Figure 6) against the bottoms of the respective ramp sections 73. This position is reached before the entrance ramps reach a vertical position so as to maintain the wheels 88 and 89 in positions wherein downward movement of the lift and subsequent engagement of these wheels with the surrounding surface will move the entrance ramps back toward their normal positions as the lift is lowered. The downward swinging of the entrance ramps is provided so as to eliminate as much as possible any interference with the movement of mechanics around the vehicle.

After the necessary work has been performed on the vehicle, the lift is lowered and the wheels 88 and 89 of the entrance ramps contact with the ground in the manner stated and are gradually swung upwardly to their normal positions. Such normal positions of the entrance ramps will be reached when the lift has been lowered to its limit of movement. The vehicle is then started in reverse and backed off from the lift. It will be apparent that just before the lift reached its lower limit of movement the beam 16 will have become separated from the rails 11 and accordingly the unit 14 will be free to roll on the wheels 23 when the vehicle is backed off from the lift. Rearward movement of the rear vehicle wheels takes place over the ramp section 73 until they reach positions past the pivot axis of the ramp section 73, whereupon the springs 72 will return the ramp plates 68 to the normal position shown in Figure 6, such movement of the ramp plates 68 lifting the free ends of the ramp section 73 until the chains 80 limit the movement of the parts with the plates 68 and ramp section 73 in their normal positions shown in Figure 6.

As the vehicle continues to move rearwardly the unit 14 will approach the unit 15 and the wheels 39 (Figure 6) will engage the respective inclined plates 65 and move thereover until the cross members 21 engage the beam sections 47 to limit further movement of the unit 14. At this time, each cross member 26 will be in engagement with its associated ramp plate 68 to prevent downward movement of the right hand end thereof as viewed in Figure 6. Continued movement of the vehicle rearwardly will then cause the front wheels to roll over the pivoted chock plates 31 and these plates will be turned by the vehicle wheels until they assume the locking position shown in Figure 6 with the flange 34 of each plate 31 in its associated slot 70. The unit 14 will now be again placed in interlocking relationship ready for the next operation, and the vehicle may be entirely backed off from the apparatus as will be obvious.

In previous constructions, the wheels corresponding to the wheels 23 of the present apparatus have been made of steel and the repeated rolling of these wheels over the concrete surface with which they are in contact, with the weight of the front end of the vehicle supported by the front wheel unit, has resulted in the abrasion and finally the substantial wearing and grooving of the concrete surface in addition to rendering the operation rather noisy. The provision of the rubber tires 24 eliminates both of these difficulties.

However, the use of rubber tires 24 of sufficient thickness to withstand substantial usage results in their being substantially deformed under the weight of the front end of the vehicle when the front wheels move into position on the unit 14. The accompanying downward movement of the unit 14 was found to have a tendency to disturb the normal functioning of the interlocking parts. For example, such downward movement caused contact between the under side of the plates 31 and the left hand ends of the ramp plate 68 as viewed in Figure 6, thus resulting in the swinging upwardly of the right hand ends of the plate 31 sufficiently to disengage the flanges 34 from the openings 70. With the present construction, however, it will be apparent that the rollers 39, which never contact the surrounding concrete surface, will solidly support the right hand end of each unit 14 by engagement with the inclined plates 65 which, in turn, are solidly supported by the surrounding concrete surface. Thus the deforming of the rubber tires cannot take place prior to the passage of the front wheels of a vehicle onto the plate 31, and accordingly the deforming of the rubber tires cannot affect the operation of the apparatus.

From the foregoing it will be apparent that the present invention involves substantial improvements over prior constructions of this type as represented in my prior Patents Nos. 2,199,524 and 2,231,362. It is unnecessary to provide any parts specifically for the purpose of interlocking the units 14 and 15 or to provide parts specifically for the purpose of unlocking the units when the vehicle is to be moved from the apparatus. The ramp plate 68 at each side of the apparatus engages its associated pivoted chocking plate 31 to lock the two units together, and the locking and unlocking actions are performed solely through the weight of the vehicle moving onto and off from the apparatus. Accordingly the apparatus is materially simplified and is rendered more easily and positively operable and at the same time the cost of production of the apparatus is quite materially decreased. The unit 15 may be rolled into and removed from operative position in the same manner as the corresponding unit of my prior Patent No. 2,231,362 but is additionally advantageous thereover in that it provides for the dropping of the entrance ramps into inoperative position when the lift is elevated. The apparatus is further characterized by the complete absence of complicated and expensive locking dogs, cams, etc., as well as the complete absence of oddly shaped openings which are relatively expensive to produce.

It is ot be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon.

2. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon, and means for holding said members in normal position for the passage of a vehicle wheel thereover.

3. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon, the other unit being movable away from the first named unit and having a pair of chocking members one of which is movable and normally arranged in a position to form a continuation of one of said pivoted members when said units are in adjacent relationship, said movable chock element being arranged to be moved by a vehicle wheel passing thereover to assume chocking relationship with respect to such vehicle wheel.

4. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon, means for holding said members in normal position for the passage of a vehicle wheel thereover, the other unit being movable away from the first named unit, and means for releasing said holding means upon movement of said other unit away from the first named unit.

5. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon, the other unit being movable away from the first named unit and having a pair of chocking members one of which is movable and normally arranged in a position to form a continuation of one of said pivoted members when said units are in adjacent relationship, said movable chock element being arranged to be moved by a vehicle wheel passing thereover to assume a chocking relationship with respect to such vehicle wheel, and means cooperating between said movable chocking member and the adjacent ramp member for interlocking said units with respect to each other, and means operative upon movement of said movable chocking element for releasing said interlocking means.

6. Apparatus for converting a "free-wheel" lift having parallel supporting rails into a "run-on" lift, comprising a pair of units adapted to be arranged on the supporting rails, one unit having means engageable with the rails to prevent it from moving thereon and the other being mounted to move toward and away from the first named unit, a pair of ramp structures on the first named unit each comprising a pair of members having adjacent ends in cooperating relationship for the passage of a vehicle wheel thereover when said members are in a normal position, and means constructed and arranged to be operative when the second named unit is in predetermined adjacent relationship to the first named unit for holding the members of said pairs in normal position and for releasing the members of each of said pairs for downward movement adjacent their adjacent ends when the second named unit moves away from the first named unit and vehicle wheels are arranged on said ramp structures.

7. Apparatus for converting a "free-wheel" lift having parallel supporting rails into a "run-on" lift, comprising a pair of units adapted to be arranged on the supporting rails, one unit having means engageable with the rails to prevent it from moving thereon and the other being mounted to move toward and away from the first named unit, a pair of ramp structures on the first named unit each comprising a pair of members having adjacent ends in cooperating relationship for the passage of a vehicle wheel thereover when said members are in a normal position, means constructed and arranged to be operative when the second named unit is in predetermined adjacent relationship to the first named unit for holding the members of said pairs in normal position and for releasing the members of each of said pairs for downward movement adjacent their adjacent ends when the second named unit moves away from the first named unit and vehicle wheels are arranged on said ramp structures, and interlocking means normally tending to hold said units in adjacent relationship and formed in part by one of the members of at least one of said pairs of ramp members.

8. Apparatus for converting a "free-wheel" lift having parallel supporting rails into a "run-on" lift, comprising a pair of units adapted to be arranged on the supporting rails, one unit having means engageable with the rails to prevent it from moving thereon and the other being mounted to move toward and away from the first named unit, a pair of ramp structures on the first named unit each comprising a pair of members having adjacent ends in cooperating relationship for the passage of a vehicle wheel thereover when said members are in a normal position, means constructed and arranged to be operative when the second named unit is in predetermined adjacent relationship to the first named unit for holding the members of said pairs in normal position and for releasing the members of each of said pairs for downward movement adjacent their adjacent ends when the second named unit moves away from the first named unit and vehicle wheels are arranged on said ramp structures, interlocking means normally tending to hold said units in adjacent relationship and formed in part by one of the members of at least one of said pairs of ramp members, and means operable when one pair of vehicle wheels passes from said first named unit to said second named unit for releasing said interlocking means.

9. Apparatus for converting a "free-wheel" lift having parallel supporting rails into a "run-on" lift, comprising a pair of units adapted to be arranged on the supporting rails, one unit having means engageable with the rails to prevent it from moving thereon and the other being mounted to move toward and away from the first named unit, a pair of ramp structures on the first named unit each comprising a pair of members having adjacent ends in cooperating relationship for the passage of a vehicle wheel thereover when said members are in a normal position, means constructed and arranged to be operative when the second named unit is in predetermined adjacent relationship to the first named unit for holding the members of said pairs in normal position and for releasing the members of each of said pairs for downward movement adjacent their adjacent ends when the second named unit moves away from the first named unit and vehicle wheels are arranged on said ramp structures, interlocking means normally tending to hold said units in adjacent relationship and formed in part by one of the members of at least one of said pairs of ramp members, means operable when one pair of vehicle wheels passes from said first named unit to said second named unit for releasing said interlocking means, and wheel chocking means carried by said second named unit and including a pair of movable chocking members normally arranged in positions for the passage of vehicle wheels thereover and movable by the vehicle wheels to chocking position.

10. Apparatus for converting a "free-wheel" lift having parallel supporting rails into a "run-on" lift, comprising a pair of units adapted to be arranged on the supporting rails, one unit having means engageable with the rails to prevent it from moving thereon and the other being mounted to move toward and away from the first named unit, a pair of ramp structures on the first named unit each comprising a pair of members having adjacent ends in cooperating relationship for the passage of a vehicle wheel thereover when said members are in a normal position, means constructed and arranged to be operative when the second named unit is in predetermined adjacent relationship to the first named unit for holding the members of said pairs in normal position and for releasing the members of each of said pairs for downward movement adjacent their adjacent ends when the second named unit moves away from the first named unit and vehicle wheels are arranged on said ramp structures, interlocking means normally tending to hold said units in adjacent relationship, said other unit having wheel chocking means thereon comprising movable wheel chocking members adapted to be moved by the passage of vehicle wheels thereover to chocking position and to simultaneously release said interlocking means.

11. Apparatus for converting a "free-wheel" lift having parallel supporting rails, into a "run-on" lift, comprising a pair of units adapted to be arranged on the supporting rails, one unit having means engaging the lift to prevent movement of such unit with respect to the rails and the other unit having rollers for supporting it on the surrounding surface for movement from the first named unit, said first named unit having a pair of ramp structures at each side thereof, each comprising a pair of members having adjacent ends for the passage of a vehicle wheel thereover onto the other unit when said members are in a normal position, said members being pivoted at points remote from said adjacent ends whereby the latter are movable downwardly under the weight of a vehicle thereon, means carried by the second named unit and engageable beneath the member of each pair adjacent the second named unit to support the members of said pairs in their normal position for the passage of one pair of vehicle wheels thereover onto the second named unit when said units are in predetermined adjacent relationship, said supporting means being movable with the second named unit upon movement thereof away from the first named unit to release the members of said pair for downward movement at their adjacent ends upon the passage of the other vehicle wheels thereonto.

12. Apparatus for converting a "free-wheel" lift having parallel supporting rails, into a "run-on" lift, comprising a pair of units adapted to be arranged on the supporting rails, one unit having means engaging the lift to prevent movement of such unit with respect to the rails and the other unit having rollers for supporting it on the surrounding surface for movement from the first named unit, said first named unit having a pair of ramp structures at each side thereof, each comprising a pair of members having adjacent ends for the passage of a vehicle wheel thereover onto the other unit when said members are in a normal position, said members being pivoted at points remote from said adjacent ends whereby the latter are movable downwardly under the weight of a vehicle thereon, means carried by the second named unit and engageable beneath the member of each pair adjacent the second named unit to support the members of said pairs in their normal position for the passage of one pair of vehicle wheels thereover onto the second named unit when said units are in predetermined adjacent relationship, said supporting means being movable with the second named unit upon movement thereof away from the first named unit to release the members of said pair for downward movement at their adjacent ends upon the passage of the other vehicle wheels thereonto, and means normally holding said units in said predetermined relationship.

13. Apparatus for converting a "free-wheel" lift having parallel supporting rails, into a "run-on" lift, comprising a pair of units adapted to be arranged on the supporting rails, one unit having means engaging the lift to prevent movement of such unit with respect to the rails and the other unit having rollers for supporting it on the surrounding surface for movement from the first named unit, said first named unit having a pair of ramp structures at each side thereof, each comprising a pair of members having adjacent ends for the passage of a vehicle wheel thereover onto the other unit when said members are in a normal position, said members being pivoted at points remote from said adjacent ends whereby the latter are movable downwardly under the weight of a vehicle thereon, means carried by the second named unit and engageable beneath the member of each pair adjacent the second named unit to support the members of said pairs in their normal position for the passage of one pair of vehicle wheels thereover onto the second named unit when said units are in predetermined adjacent relationship, said supporting means being movable with the second named unit upon movement thereof away from the first named unit to release the members of said pair for downward movement at their adjacent ends upon the passage of the other vehicle wheels thereonto, and means formed in part by one member of at least one of said pairs for normally holding said units in said predetermined adjacent relationship.

14. Apparatus for converting a "free-wheel" lift having parallel supporting rails, into a "run-on" lift, comprising a pair of units adapted to be arranged on the supporting rails, one unit having means engaging the lift to prevent movement of such unit with respect to the rails and the other unit having rollers for supporting it on the surrounding surface for movement from the first named unit, said first named unit having a pair of ramp structures at each side thereof, each comprising a pair of members having adjacent ends for the passage of a vehicle wheel thereover onto the other unit when said members are in a normal position, said members being pivoted at points remote from said adjacent ends whereby the latter are movable downwardly under the weight of a vehicle thereon, means carried by the second named unit and engageable beneath the member of each pair adjacent the second named unit to support the members of said pairs in their normal position for the passage of one pair of vehicle wheels thereover onto the second named unit when said units are in predetermined adjacent relationship, said supporting means being movable with the second named unit upon movement thereof away from the first named unit to release the members of said pair for downward movement at their adjacent ends upon the passage of the other vehicle wheels thereonto, and chocking means carried by said second named unit and including a pivoted chocking member for each of a pair of vehicle wheels, said chocking members normally occupying a position for the passage of such vehicle wheels thereover from said pairs of members and each having a portion operative when in such position for engaging a portion of the first named structure to lock said structures in said predetermined adjacent relationship.

15. Apparatus for converting a "free-wheel" lift having parallel supporting rails, into a "run-on" lift, comprising a pair of units adapted to be arranged on the supporting rails, one unit having means engaging the lift to prevent movement of such unit with respect to the rails and the other unit having rollers for supporting it on the surrounding surface for movement from the first named unit, said first named unit having a pair of ramp structures at each side thereof, each comprising a pair of members having adjacent ends for the passage of a vehicle where thereover onto the other unit when said members are in a normal position, said members being pivoted at points remote from said adjacent ends whereby the latter are movable downwardly under the weight of a vehicle thereon, means carried by the second named unit and engageable beneath the member of each pair adjacent the second named unit to support the members of said pairs in their normal position for the passage of one pair of vehicle wheels thereover onto the second named unit when said units are in predetermined adjacent relationship, said supporting means being movable with the second named unit upon movement thereof away from the first named unit to release the members of said pair for downward movement at their adjacent ends upon the passage of the other vehicle wheels thereonto, the member of one of said pairs adjacent the second named unit having an opening therein, and means carried by said second named unit and normally engageable in said opening to prevent movement of the second named unit away from the first named unit.

16. Apparatus for converting a "free-wheel" lift having parallel supporting rails, into a "run-on" lift, comprising a pair of units adapted to be arranged on the supporting rails, one unit having means engaging the lift to prevent movement of such unit with respect to the rails and the other unit having rollers for supporting it on the surrounding surface for movement from the first named unit, said first named unit having a pair of ramp structures at each side thereof, each comprising a pair of members having adjacent ends for the passage of a vehicle wheel thereover onto the other unit when said members are in a normal position, said members being pivoted at points remote from said adjacent ends whereby the latter are movable downwardly under the weight of a vehicle thereon, means carried by the second named unit and engageable beneath the member of each pair adjacent the second named unit to support the members of said pairs in their normal position for the passage of one pair of vehicle wheels thereover onto the second named unit when said units are in predetermined adjacent relationship, said supporting means being movable with the second named unit upon movement thereof away from the first named unit to release the members of said pair for downward movement at their adjacent ends upon the passage of the other vehicle wheels thereonto, the member of one of said pairs adjacent the second named unit having an opening therein, and chocking means carried by said second named unit and including movable devices one of which has means normally engageable in said opening to prevent movement of the second named unit away from the first named unit.

17. Apparatus for converting a "free-wheel" lift, having parallel supporting rails, into a "run-on" lift, comprising a pair of units adapted to be arranged on the supporting rails, one unit being fixed to the rails and the other having rollers supporting it for movement away from the first named unit when the lift is in its lower position, a pair of plates carried by the first named unit at each side thereof, and having adjacent edges in overlapping relationship, means for supporting said plates in a normal position forming a runway for the passage of a pair of vehicle wheels thereover onto the second named unit, and means carried by the second named unit and engageable beneath the plate of each pair which has its edge arranged beneath the edge of the other plate, whereby it is supported in position while said second named unit is in predetermined adjacent relationship to the first named unit, said overlapping plate edges being free to drop upon movement of said second named unit away from said first named unit whereby said plates act as chocking means for the other wheels of the vehicle.

18. Apparatus for converting a "free-wheel" lift, having parallel supporting rails, into a "run-on" lift, comprising a pair of units adapted to be arranged on the supporting rails, one unit being fixed to the rails and the other having rollers supporting it for movement away from the first named unit when the lift is in its lower position, a pair of plates carried by the first named unit at each side thereof, and having adjacent edges in overlapping relationship, means for supporting said plates in a normal position forming a runway for the passage of a pair of vehicle wheels thereover, onto the second named unit, and means carried by the second named unit and engageable beneath the plate of each pair which has its edge arranged beneath the edge of the other plate, whereby it is supported in position while said second named unit is in predetermined adjacent relationship to the first named unit, the plates of each pair being pivoted at points remote from the overlapping edges thereof whereby they are free to swing downwardly under the weight of the vehicle when the other wheels thereof move into positions on said plates and said second named unit moves away from said first named unit.

19. Apparatus for converting a "free-wheel" lift, having parallel supporting rails, into a "run-on" lift, comprising a pair of units one having means for fixing it to said rails and the other being supported for movement away from said first named unit, said first named unit having a pair of ramp structures for the passage thereover of vehicle wheels, each ramp structure having a section thereof pivoted at a point remote from the entering end thereof whereby it is free to swing downwardly by gravity when the lift is elevated, to assume a position at relatively slight angle to the vertical, and a wheel carried by the free end of each pivoted section engageable with the surrounding surface to be moved upwardly relative to the vehicle lift when the latter is lowered.

20. Apparatus for converting a "free-wheel" lift, having parallel supporting rails, into a "run-on" lift, comprising a pair of units one having means for fixing it to said rails and the other being supported for movement away from said first named unit, said first named unit having a pair of ramp structures for the passage thereover of vehicle wheels, each ramp structure having a section thereof pivoted at a point remote from the entering end thereof whereby it is free to swing downwardly by gravity when the lift is elevated, to assume a position at a relatively slight angle to the vertical, a wheel carried by the free end of each pivoted section engageable with the surrounding surface to be moved upwardly relative to the vehicle lift when the latter is lowered, and means for limiting downward swinging movement of said sections whereby said wheels, when in their lowermost positions, will be offset toward the entering end of the lift from a vertical plane passing through the pivots of said sections.

21. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon, and an entrance ramp normally forming substantially a continuation of the ramp structure of each pair and pivoted thereto remote from the front wheel supporting unit for downward swinging movement when the lift is elevated.

22. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon, and an entrance ramp normally forming substantially a continuation of the ramp structure of each pair and pivoted thereto remote from the front wheel supporting unit for downward swinging movement when the lift is elevated, the free end of each entrance ramp having a wheel thereon engageable with the surrounding surface to be supported thereby during downward movement of the lift to be restored to its normal position.

23. Apparatus for converting a "free-wheel" lift, having parallel supporting rails, into a "run-on" lift, comprising a pair of units adapted to be arranged on the supporting rails, one for supporting the front vehicle wheels and the other for supporting the rear vehicle wheels, one of said units having a pair of ramp structures each comprising a pair of members having adjacent ends in cooperative relationship and normally positioned for the passage of a vehicle wheel thereover onto the other unit, said members being pivoted at points remote from said cooperating ends whereby the latter are movable downwardly under the weight of a vehicle thereon under predetermined conditions to chock the vehicle wheel thereon, an entrance ramp normally forming substantially a continuation of the ramp structure of each pair and pivoted thereto remote from the front wheel supporting unit for downward swinging movement when the lift is elevated, the free end of each entrance ramp having a wheel thereon engageable with the surrounding surface to be supported thereby during downward movement of the lift to be restored to its normal position, and means for limiting downward swinging movement of each entrance ramp to a position offset toward the entrance end of the lift from a vertical plane passing through the pivot axis of such entrance ramp.

24. Apparatus for converting a "free-wheel" lift, having parallel supporting rails, into a "run-on" lift, comprising a pair of units adapted to be arranged on the supporting rails, one of said units being immovable along the rails and the other having wheels engaging the surrounding surface whereby it is movable toward and away from the first named unit, said wheels having deformable cushion rims, said units having cooperating means providing for the passage of a pair of vehicle wheels over the first named unit onto the second named unit whereupon the latter is movable away from the first named unit, and means for positively bodily supporting the end of the second named unit adjacent the first named unit when said units are in predetermined adjacent relationship.

25. Apparatus for converting a "free-wheel" lift, having parallel supporting rails, into a "run-on" lift, comprising a pair of units adapted to be arranged on the supporting rails, one of said units being immovable along the rails and the other having wheels engaging the surrounding surface whereby it is movable toward and away from the first named unit, said wheels having deformable cushion rims, said units having cooperating means providing for the passage of a pair of vehicle wheels over the first named unit onto the second named unit whereupon the latter is movable away from the first named unit, means for locking said second named unit in adjacent predetermined relationship to said first named unit, and means for positively bodily supporting the end of the second named unit adjacent the first named unit when said units are in predetermined adjacent relationship.

26. Apparatus for converting a "free-wheel" lift, having parallel supporting rails, into a "run-on" lift, comprising a pair of units adapted to be arranged on the supporting rails, one of said units being immovable along the rails and the other having wheels engaging the surrounding surface whereby it is movable toward and away from the first named unit, said wheels having deformable cushion rims, said units having cooperating means providing for the passage of a pair of vehicle wheels over the first named unit onto the second named unit whereupon the latter is movable away from the first named unit, and means interengageable between said units for maintaining them in predetermined adjacent relationship and for releasing said second named unit for movement away from said first named unit when a pair of vehicle wheels have passed over to said second named unit, said second named unit having a portion at the end thereof adjacent said first named unit engageable with the latter to positively bodily support such end of said second named unit when said units are in said predetermined adjacent relationship.

27. Apparatus for converting a "free-wheel" lift, having parallel supporting rails, into a "run-on" lift, comprising a pair of units adapted to be arranged on the supporting rails, one of said units being immovable along the rails and the other being movable therealong, said movable unit comprising a frame and supporting wheels therefor having deformable cushion rims, said units having cooperating means providing for the passage of a pair of vehicle wheels over the immovable unit onto the movable unit whereupon the latter is movable away from the immovable unit, means for locking said movable unit with respect to said immovable unit with the units in adjacent predetermined relationship, and means for poistively preventing downward movement of the end of said frame adjacent said immovable unit when said units are in said adjacent predetermined relationship.

PHILIP J. KROLL.